United States Patent [19]

Santhanam

[11] 4,377,356

[45] * Mar. 22, 1983

[54] METHOD AND APPARATUS FOR MOVING COAL INCLUDING ONE OR MORE INTERMEDIATE PERIODS OF STORAGE

[75] Inventor: Chakra J. Santhanam, Lexington, Mass.

[73] Assignee: Arthur D. Little, Inc., Cambridge, Mass.

[*] Notice: The portion of the term of this patent subsequent to Jun. 10, 1997, has been disclaimed.

[21] Appl. No.: 209,127

[22] Filed: Nov. 21, 1980

[51] Int. Cl.³ .................... B65G 53/30; B65G 53/16
[52] U.S. Cl. .................................... 406/109; 406/146; 406/175; 406/197
[58] Field of Search .................... 406/38, 39, 46, 109, 406/146, 169, 175, 197

[56] References Cited

U.S. PATENT DOCUMENTS

| | | | |
|---|---|---|---|
| 1,385,447 | 7/1921 | Hamilton | 406/197 |
| 3,180,691 | 4/1965 | Wunsch et al. | 406/197 |
| 3,373,883 | 3/1968 | Ostberg et al. | 406/109 |
| 3,385,635 | 5/1968 | Carlsen | 406/109 X |
| 3,976,443 | 8/1976 | Paull et al. | 48/197 R |
| 4,205,931 | 6/1980 | Singer et al. | 406/175 X |
| 4,206,610 | 6/1980 | Santhanam | 406/197 X |

Primary Examiner—Jeffrey V. Nase
Attorney, Agent, or Firm—Richard J. Hammond

[57] ABSTRACT

Finely divided coal is slurried with liquid carbon dioxide and pumped from a source (mine, dump, railway car, etc.) to a loading pier where, after deslurrying, the coal is pneumatically carried by gaseous carbon dioxide into a storage facility or directly to a waterborne carrier. The coal is maintained under a blanket of carbon dioxide gas during storage and transport. When the waterborne carrier, which may be an ocean going vessel or an inland waterway vessel, reaches its destination, the coal is removed using carbon dioxide gas and then delivered to storage or a use point. If the use point is some distance away, the coal may be reslurried with liquid carbon dioxide and pumped to its final destination.

43 Claims, 8 Drawing Figures

METHOD AND APPARATUS FOR MOVING COAL INCLUDING ONE OR MORE INTERMEDIATE PERIODS OF STORAGE

This invention relates to method and apparatus for moving coal, including one or more intermediate periods of storage, e.g., by waterborne carrier; and more particularly to moving coal, including the use of a waterborne carrier, using carbon dioxide, in gaseous and liquid form as a transporting agent.

The ever-increasing emphasis on the use of so-called "steam coal" as a replacement for oil as a boiler fuel and as an energy source for many other applications points up the need for improved method and apparatus for transporting the coal, both within the United States and from the United States to foreign countries. At present the transporting of coal by waterborne carriers, e.g., ocean-going colliers or internal waterway barges, requires the delivery of the coal to a port by rail and the subsequent loading of the coal at the port onto the waterborne carrier by mechanical loading means. To provide the necessary coal transport point at a coal-loading pier requires additional railroad lines and switching facilities, and specialized dumping equipment, conveyors and port-loading equipment, as well as the auxiliary facilities necessary to maintain all of this equipment in operation. Similar equipment is, of course, required at a coal receiving port. Moreover, many ports which could otherwise be used to ship or receive coal are not usable for the purpose because the channels leading into them are not deep enough to handle the larger coal-carrying vessels. The costs involved in constructing new coal-loading piers or enlarging the present ones, as well as of deepening channels where necessary, are extremely high, and the operation of such facilities once installed is labor intensive. Finally, the construction and use of such facilities present environmental problems, both with regard to the handling of the coal and the dredging of channels.

It would therefore be desirable to have improved method and apparatus for transporting coal, including the use of a waterborne carrier, which minimize the requirements for new pier construction and channel modifications and which thus offer within a relatively brief period of time the possibility of materially increasing the capacity to ship coal both within the United States and intercontinentally.

It is therefore a primary object of this invention to provide an improved method for moving coal which includes the use of a waterborne carrier. It is another object to provide a method of the character described which minimizes the amount of construction required at a coal-loading pier by eliminating the need for dumping equipment, for mechanical conveyors capable of handling coal in lump form, and for additional railroad facilities. It is an additional object to provide a method for moving coal which is particularly suited to automated operation, is flexible in its adaptability to a wide range of situations and is capable of handling all types of coals. A further object of this invention is to provide a method for moving coal which offers the possibility of minimizing or even eliminating serious environment problems associated with both the handling of the coal itself and with the need to provide deeper harbor channels.

Another primary object of this invention is to provide improved apparatus for moving coal which includes the loading and/or unloading of coal on a waterborne carrier such as an ocean-going collier or an internal waterway barge. It is still a further object to provide apparatus of the character described which eliminates the need for dumping equipment, mechanical conveyors, mechanical port loading and unloading equipment and extensive additional rail facilities along with the auxiliary facilities required to operate such equipment. An additional object is the providing of such apparatus which is particularly suited for operation as an essentially completely automated, closed and pollution-free system.

Other objects of the invention will in part be obvious and will in part be apparent hereinafter.

The invention accordingly comprises the several steps and relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

According to one aspect of this invention there is provided a method of transporting coal, including one or more intermediate periods of storage, comprising the steps of providing coal in finely divided particulate form; storing the finely divided coal in a storage space under a protective blanket of gaseous carbon dioxide; introducing the coal into or withdrawing the coal from the storage space by pneumatically pumping it with gaseous carbon dioxide; and pumping the coal as a coal/liquid carbon dioxide slurry to or from the vicinity of the storage space before introducing the coal into or after withdrawing the coal from the storage space.

According to another aspect of this invention there is provided a method of loading coal onto a waterborne carrier, comprising the steps of providing coal in finely divided particulate form in a coal/liquid carbon dioxide slurry; removing the coal from the slurry; pneumatically pumping the coal onto a waterborne carrier; and maintaining a protective gaseous blanket over the coal in the carrier.

According to a further aspect of this invention there is provided a method of unloading coal from a waterborne carrier characterized by the step of pneumatically pumping coal with gaseous carbon dioxide or air from a waterborne carrier to a predetermined point.

Yet another aspect of this invention is the providing of a system for the transportation of coal including one or more intermediate periods of storage, comprising, in combination, storage means to store coal in finely divided particulate form under a protective blanket of gaseous carbon dioxide; pneumatic pumping means arranged to convey the coal into or withdraw the coal from the storage means by penumatically pumping it with gaseous carbon dioxide; slurrying means arranged to form a pumpable coal/liquid carbon dioxide slurry; deslurrying means arranged to separate the coal from the slurry; and slurry pumping means arranged to pump the slurry from said slurrying means to deslurrying means, the order of means in the system being the slurrying means, the slurry pumping means, the deslurrying means and the pneumatic pumping means to convey the coal into the storage means, and the pneumatic pumping means, the slurrying means, the slurry pumping means and the deslurrying means to withdraw the coal from the storage means.

According to a still further aspect of this invention there is provided apparatus for loading coal onto a waterborne carrier, comprising, in combination, coal supply means to provide coal in finely divided particulate form; slurrying means arranged to form a pumpable liquid carbon dioxide slurry with the coal; deslurrying means arranged to separate the coal from the slurry and located in the vicinity of an anchorage for the carrier; slurry pumping means arranged to pump the slurry from the slurrying means to the deslurrying means under conditions of temperature and pressure to maintain the carbon dioxide in liquid form; and pneumatic pumping means arranged to convey the coal dispersed in gaseous carbon dioxide from the deslurrying means onto the waterborne carrier.

According to a final aspect of this invention there is provided apparatus for unloading coal from a waterborne carrier characterized as comprising pneumatic pumping means arranged to discharge coal in finely divided particulate form dispersed in gaseous carbon dioxide or air from a waterborne carrier through conduit means to a predetermined point.

For a fuller understanding of the nature and objects of the invention, reference should be had to the following detailed description taken in connection with the accompanying drawings in which FIGS. 1A and 1B, in combination, comprise a diagram showing the method and apparatus of this invention, including a number of alternative embodiments, for transporting coal from a source point and loading it onto a waterborne carrier;

Figure 1A:
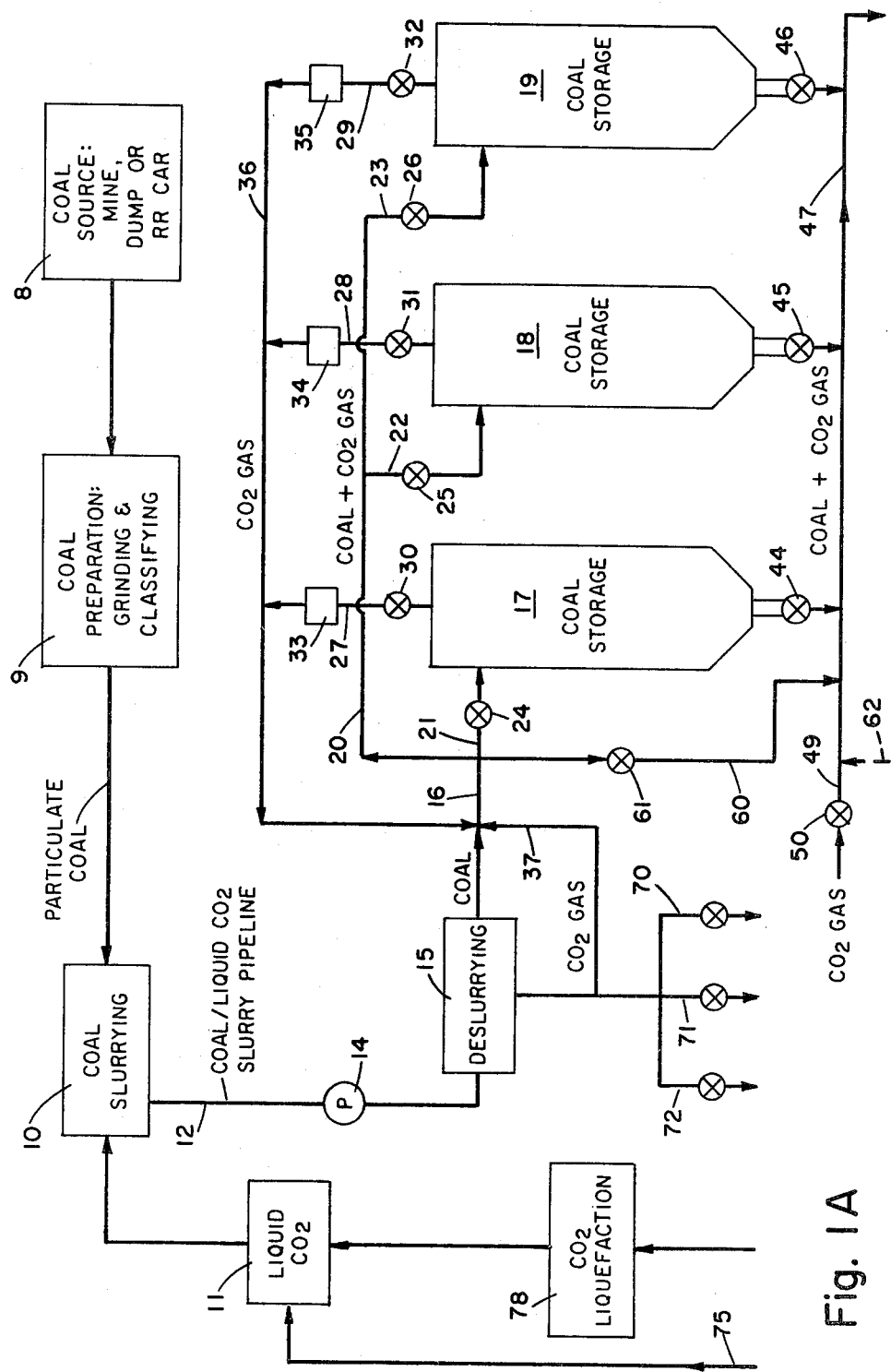

In the method of this invention, liquid and gaseous carbon dioxide are used as carriers for the coal in the form of finely divided particulate material. The coal forms a pumpable slurry with the liquid carbon dioxide and can be pneumatically conveyed in gaseous carbon dioxide. In order to be handled in this manner the coal particles must be sized to pass a U.S. 50-mesh screen, i.e., the particles should be not greater than about 300 microns in diameter. A minor percentage (e.g., up to about 40% by weight) of the coal may be sized fine enough to pass a 325-mesh screen (40 microns in diameter). It is, however, preferable to use coal having a controlled particle size distribution, this distribution being optimized for the viscosity of the liquid carbon dioxide being used as detailed below. The size distribution of the coal particles should preferably be that which give rise to a stable slurry, i.e., a slurry from which the coal particles will not settle out to any appreciable degree. This allows a pipeline containing slurry to be shut down and have the flow therethrough restarted by only restarting the pump.

The use of liquid carbon dioxide to form a pumpable slurry has distinct advantages over a coal/water slurry, including the elimination of the need to deplete critical water supplies in a number of coal-producing Western states and the difficulties inherent in separating the coal from the water slurry at the point of storage and/or use. Moreover, it allows the making of slurries with those types of coals having high concentrations of water-reactive alkaline constituents.

In U.S. Pat. No. 4,206,610 I have disclosed a novel method for transporting coal which comprises suspending coal in finely divided form in liquid carbon dioxide to form a coal/liquid carbon dioxide slurry and pumping the slurry from a coal source point to a coal use point through a pipeline under conditions of temperature and pressure to maintain essentially all of the carbon dioxide in liquid form. According to a preferred embodiment of this method, the carbon dioxide is maintained at a temperature between about $-20°$ C. and $30°$ C. and at a pressure between about 20 and about 150 atmospheres. This patent also discloses a novel apparatus for transporting coal in finely divided form from a coal source point to a coal use point which comprises, in combination, slurry forming means at a coal source point to form a coal/liquid carbon dioxide slurry; deslurrying means at a coal use point to deslurry the coal/liquid carbon dioxide slurry to provide coal for combustion and essentially coal-free carbon dioxide; and slurry pipeline means connecting the slurry forming means and the deslurrying means arranged to carry the coal/liquid carbon dioxide slurry under conditions of temperature and pressure to maintain essentially all of the carbon dioxide in liquid form.

I have now found that the use of a coal/liquid carbon dioxide slurry in conjunction with gaseous carbon dioxide makes it possible to handle, store and move coal, including transportation on a waterborne carrier, without the need for the presently used equipment now used at coal loading and unloading piers. Moreover, it is possible to load a coal-carrying vessel anchored at a point remote from the pier or dock itself, thus eliminating the need for deepening harbor channels, for the vessel may remain out of the harbor in deep water in a manner similar to the present practice of unloading oil tankers.

Figure 1B:
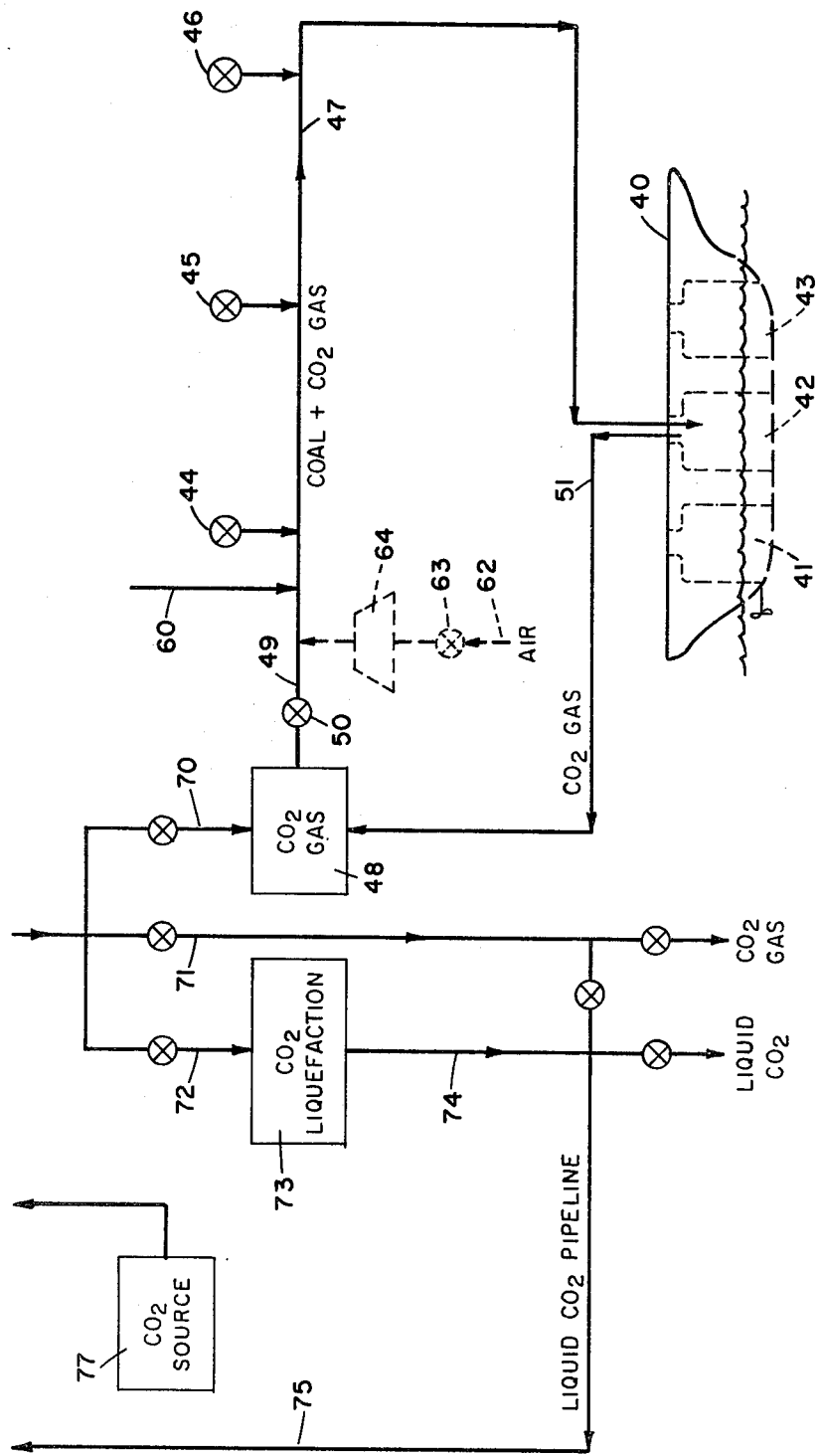

FIGS. 1A and 1B diagram the method and apparatus making up the coal handling system of this invention used in loading onto a waterborne carrier. The alternative embodiments available will become apparent from the following detailed description of FIGS. 1A and 1B.

The coal to be handled may originate at any suitable source point 8, e.g., at the coal mine itself, at a coal dump removed from the mine or directly from some form of conventional coal moving equipment such as a railroad car. The coal is prepared for slurrying at a preparation point 9 by reducing it to the desired particle size distribution, e.g., by grinding or other well-known technique and, if necessary, classifying with respect to particle size. Such preparation and handling follow standard procedures and may be carried out in conventional, commercially available equipment. The coal in finely divided particulate form is then slurried at 10 with liquid carbon dioxide supplied from a suitable source 11, e.g., a pressurized storage vessel. The carbon dioxide may, if desired, be obtained by burning coal and recovering it in essentially pure form from the combustion gases; or it may be recycled from a slurry delivery point; or any suitable combination of such sources may be used.

Although the pressure of the liquid carbon dioxide in the slurry as it is pumped through the coal/liquid carbon dioxide pipeline 12 will range between about 20 and about 150 atmospheres and the temperature will range between about −20° C. and 30° C., liquefaction and storage of the carbon dioxide need not be carried out within this range since adjustments in pressure and temperature may be made as the liquid carbon dioxide is conducted from storage to the slurrying equipment.

Figure 2:
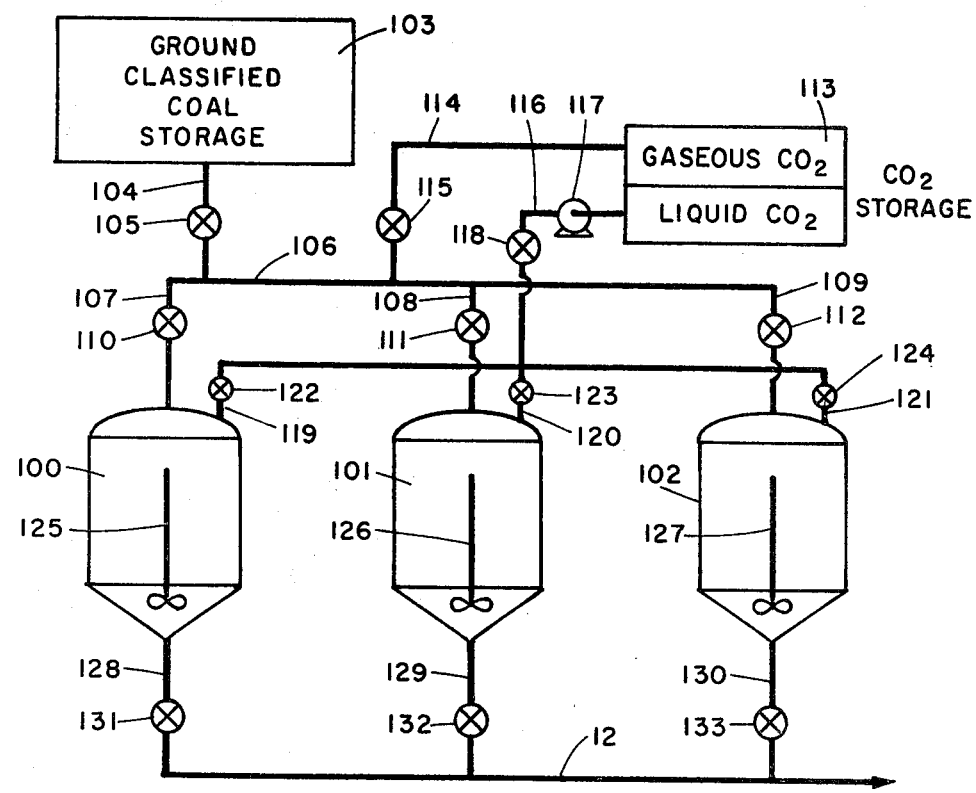
FIG. 2 is a schematic diagram of one embodiment of method and apparatus for forming a coal/liquid carbon dioxide slurry based on slurrying successive batches of coal.
Figure 3:
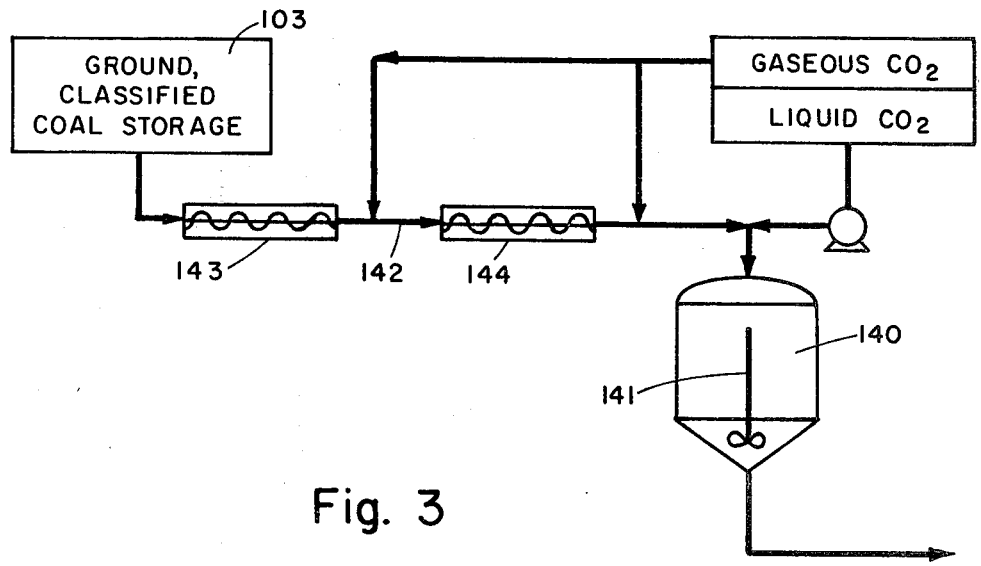
FIG. 3 is a schematic diagram of another embodiment of method and apparatus for forming a coal/liquid carbon dioxide slurry based on a continual slurrying of the coal.

FIGS. 2 and 3 illustrate two embodiments of method and apparatus suitable for forming the coal/liquid carbon dioxide slurry. One embodiment, based on slurrying successive batches of coal, is illustrated in FIG. 2. As will be seen in FIG. 2, there are provided a number of pressurizable coal bins 100, 101, and 102 which are connected to a coal storage bin 103 through a coal conduit 104 having a valve 105 and communicating with a main conduit 106. Branch conduits 107, 108, and 109, having valves 110, 111 and 112, respectively, lead from main conduit 106 to the pressurizable coal bins. A liquid carbon dioxide storage vessel 113 provides both gaseous carbon dioxide, through line 114 and valve 115, and liquid carbon dioxide, through line 116, pump 117 and valve 118, to the pressurizable coal bins, by way of branch conduits 119, 120 and 121 having valves 122, 123 and 124, respectively. Each of the coal bins is equipped with a suitable stirring means 125, 126 and 127 and each has a slurry discharge line, 128, 129 and 130, controlled by valves 131, 132 and 133, respectively, and communicating with main slurry pipeline 12.

The operation of the apparatus of FIG. 2 in forming the required coal/liquid carbon dioxide may be illustrated in the following example in which it is assumed that pressurizable coal bin 100 is to be used. To begin, all valves except 105 and 110 are closed and coal is pumped or fed by gravity into bin 100 to a predetermined level. Valve 105 is then closed and valve 115 is opened to allow high-pressure gaseous carbon dioxide to flow into bin 100 and pressurize it to the desired level. Subsequently, valve 115 is closed and valve 122 is opened to permit liquid carbon dioxide to be pumped into bin 100 and to be slurried, by stirring, with the pressurized coal. After a sufficient quantity of liquid carbon dioxide has been pumped into bin 100, valves 122 and 110 are closed and valve 131 is opened to discharge the coal/liquid carbon dioxide slurry into main slurry pipeline 12 for transport through the pipeline. By using each pressurizable coal bin in turn in the manner described, it is possible to provide an essentially continuous supply of slurried coal to pipeline 12. It is, of course, within the scope of this invention to use any number of pressurizable coal bins in this batch process embodiment.

Another embodiment of the slurrying method and apparatus is illustrated in FIG. 3 and is designed to continually form the required pressurized slurry using a single pressurizable coal bin 140 equipped with stirring means 141. In coal conduit 142 connecting coal storage 103 and bin 140 are two (or more) screw conveyors 143 and 144 of a type which permits a pressure drop to be maintained thereacross. These screw conveyors are pressure staged in order to provide coal under the desired pressure to bin 140 e.g., at about 60-65 atmospheres. Pressurizing is conveniently carried out by using pressurized, boiled-off gaseous carbon dioxide from carbon dioxide storage vessel 113. The resulting pressurized coal and the pressurized liquid carbon dioxide are introduced simultaneously into bin 140 for mixing and discharge into main slurry pipeline 12.

The pressurized coal/liquid carbon dioxide slurry pumped through the main slurry pipeline 12 (FIG. 1A) should be maintained at a temperature between about −20° C. and about 30° C. and under a pressure between about 20 atmospheres and about 150 atmospheres. It will be appreciated that within these temperature and pressure ranges, the carbon dioxide is a liquid. Under these conditions there is no appreciable extraction by the liquid carbon dioxide of hydrocarbons, sulfur or other noncarbonaceous constituents from the coal. Moreover, coals containing an appreciable alkaline content are left unchanged in composition. Nor is any appreciable quantity of $H_2CO_3$ formed which might present a chemical corrosion problem.

Moreover, the finely divided coal does not agglomerate in liquid carbon dioxide, a fact which is in direct contrast to the situation which obtains in the case of coal/water slurries. Rather, the finely divided coal is easily dispersed in liquid carbon dioxide and remains dispersed during transport. The viscosity of a coal/liquid carbon dioxide slurry at about 12.5° C. is approximately one-tenth to one-thirtieth of that of a coal/water slurry at ambient temperature and at the same solids concentration, a fact which materially decreases the friction forces along the slurry pipeline. This, in turn, decreases the pressure drop and hence the power required to pump the slurry. Finally, coal can be loaded to a much higher weight percent level in liquid carbon dioxide than in water. For example, it can be loaded up to about 50% to about 55% percent by weight in water (i.e., one hundred pounds of slurry contains from about 50 to 55 pounds of finely divided coal); whereas this figure can be as high as about 75 to about 80 in pounds of coal per 100 pounds of a coal/liquid carbon dioxide slurry. Generally, a loading range of between about 60% and 80% by weight will be preferred in the practice of this invention.

If the slurry pipeline 12 is of an appreciable length, e.g., more than several miles, it is preferably buried underground below the frostline to minimize problems of icing and/or relatively large variations in temperature with changing seasons. At such depths, the average ambient temperature is normally between about 10° C. and about 16° C., a temperature range essentially midway between the specified broad range of between about −20° C. and 30° C. It is, of course, possible to insulate the pipelines to maintain the slurry temperature at a level which is not in equilibrium with that of the ground in which it is laid.

The velocity of the coal/liquid carbon dioxide slurry as it is pumped through the pipeline preferably ranges between about 1 and about 6 feet per second, the optimum velocity chosen depending upon such factors as coal composition, coal size distribution, ambient temperature, loading level, and the like.

It will be necessary for any pipeline extending over a relatively long distance, e.g., over about 100 miles, to have one or more intermediate booster pumping stations 14 associated with it to maintain the desired pumping pressure and slurry velocity. Such pumping stations may also be used to provide any necessary adjustments in temperature, e.g., makeup refrigeration or added heat to the slurry through out-of-contact heat transfer with a suitable refrigeration system, e.g., liquid nitrogen, or with a suitable heat source such as combustion gases.

Once the coal/liquid carbon dioxide slurry reaches the end of the pipeline, it is necessary to separate the carbon dioxide from the coal by deslurrying it at point 15 prior to its being placed in storage or to its transfer directly to a vessel. In deslurrying it is preferable that no appreciable amount of solid carbon dioxide is formed since it is not desirable to introduce this solid material into a storage elevator or into the compartments of a ship or barge. Thus, although it is possible to remove the carbon dioxide by merely releasing the pressure on the coal/liquid carbon dioxide slurry, this is not a preferable technique for deslurrying since it results in the formation of solid carbon dioxide with its attendant disadvantages in storage and/or separation.

Since the slurry is a solid-liquid mixture, it is possible to use such conventional dewatering equipment as solid bowl centrifuges or liquid-solid cyclone separators operating under pressure to deslurry the coal. This method has the advantage of requiring a relatively small amount of energy to reliquefy any vaporized carbon dioxide before recycling.

Figure 4:
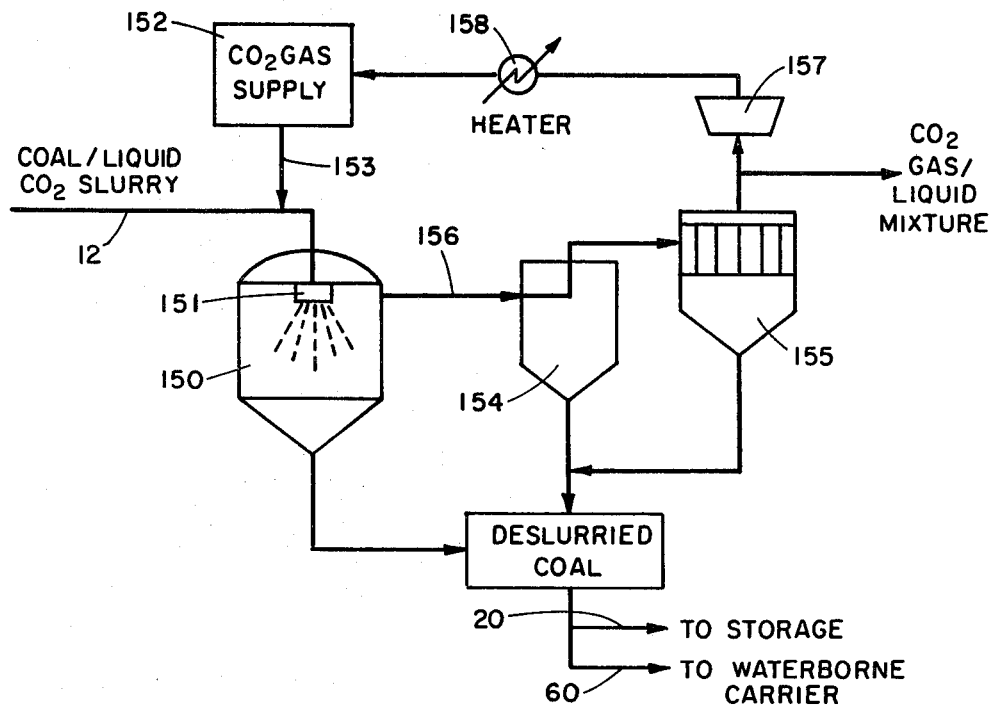
FIG. 4 is a schematic diagram of a preferred embodiment method and apparatus for deslurrying a coal/liquid carbon dioxide slurry.

FIG. 4 diagrams a preferred method and apparatus for accomplishing the step of deslurrying. The apparatus will be seen to comprise a pressurized spray tower 150 having one or more spray heads 151, a supply of gaseous carbon dioxide 152 at a predetermined temperature in fluid communication through gas line 153 with the slurry pipeline 12, a cyclone separator 154 and a bag filter 155 (optional). A gas line 156 connects tower 150, cyclone separator 154 and bag filter 155. The deslurried coal from spray tower 150, cyclone separator 154 and bag filter 155 is collected for pneumatic transport to storage elevators, or similar storage means, and/or to the waterborne carrier as described below.

In operation of the deslurrying means of FIG. 4, the liquid carbon dioxide of the slurry is expanded to reduce the pressure to that level at which essentially all of the carbon dioxide will vaporize out of the slurry. Sufficient gaseous carbon dioxide at an elevated temperature is added to the slurry from carbon dioxide gas supply 152 prior to the introduction of the slurry into spray tower 150 to provide for at least a portion of the heat lost in the expansion of the slurry, thus preventing solidification of any appreciable amount of the carbon dioxide. Any solids remaining in the carbon dioxide withdrawn through line 156 are removed in the pressurized cyclone separator (of which there may be more than one) and in the bag filter, if included. These solids may be returned to the coal if desired. A portion of the gaseous carbon dioxide from filter 155 may be recycled through expander 157 and heater 158 to carbon dioxide gas supply 152. As will be apparent from the following continued description of FIG. 1, several options are available for handling the carbon dioxide, both liquid and gas, recovered in deslurrying.

Returning now to FIG. 1A, all or a portion of the deslurried coal may be stored prior to loading on a waterborne carrier; or all of a portion of it may be loaded directly onto the carrier. The deslurried coal which is to be stored is pneumatically transported in line 16 to suitable coal storage means such as, for example, a series of elevators 17, 18 and 19, through line 20 with suitable branches 21, 22 and 23 controlled by valves 24, 25 and 26. (It will be appreciated that the drawing in FIG. 1 using lines and valves represents a simplification of the system herein described and that it is designed to represent several different embodiments of the invention. The actual choice of lines, and means to control the flow of the various materials therethrough, is well within the skill of the art).

Sufficient gaseous carbon dioxide is maintained in storage elevators 17–19 to provide a protective blanket over the coal contained therein. The amount of carbon dioxide used will be determined by conventional practice for gas blanketing. The remaining gaseous carbon dioxide used in the pneumatic transport of the coal is withdrawn through lines 27, 28 and 29 (the flow through which is controlled by valves 30, 31 and 32, respectively), and filters 33, 34 and 35 (which remove entrained coal) into a carbon dioxide recycle line 36 for recycling as a coal-carrying medium. Carbon dioxide gas resulting from the deslurrying step may also be used for this purpose as shown by line 37 of FIG. 1A. For the pneumatic pumping of the coal, it is dispersed in the gaseous carbon dioxide from whatever source as it flows through line 16.

When stored coal is to be loaded onto the waterborne carrier 40, shown to have a series of compartments 41, 42 and 43, the appropriate valve 44, 45 or 46, associated with coal elevators 17, 18 and 19, respectively, is opened to discharge the coal into vessel loading line 47. Carbon dioxide gas, from a source 48, is led into line 47, through line 49 and valve 50, to provide the carrier medium for the coal. Coal line 47 is movable from vessel compartment to compartment and it may be of such a length that the vessel may stand out from the harbor in deep water during loading.

As in the case of land-based storage, the coal in the vessel compartments will have a protective blanket of carbon dioxide in essentially the same amounts, that required in standard practice. This necessitates the removal of the excess gaseous carbon dioxide from the compartments through a suitable line 51 which can lead back to the carbon dioxide gas supply means 48 for recycling. As shown in more detail in FIG. 5, each compartment may have a permanent gas line 52 incorporating a valve 53 and being sized and arranged for connecting, through adapter means 54, to main gas line 51 having a filter 55.

If all or a portion of the deslurried coal pneumatically carried in line 16 is to be loaded directly onto carrier 40, then the coal/gaseous carbon dioxide mixture is taken through line 60, having valve 61, directly to vessel loading line 47 and the appropriate valves in the lines running to and from the storage means are closed. The excess gaseous carbon dioxide is returned from the vessel compartments to carbon dioxide gas supply means 48 as previously described.

It is, of course, within the scope of this invention to discharge all or a portion of the gaseous carbon dioxide into the atmosphere at any suitable point in the system. However it will generally be preferable to maintain the system as an essentially closed, recycling one, both to save any energy which might be required to generate the carbon dioxide lost by such discharging and to ensure that the environment associated with the system remains free from any coal dust. FIG. 1B also shows, through the use of dotted lines, the possible use of air, taken in through line 62, valve 63 and compressor 64, as a carrier for the coal in vessel loading line 47. If air is used in this capacity then it may be discharged from the vessel compartments into the atmosphere after the coal particles are filtered out, and gas return line 51 may be eliminated.

As will be seen from FIGS. 1A and 1B, the carbon dioxide recovered from deslurrying which is not used in pneumatically transporting the coal to storage or to the vessel may be handled in one or more of several ways. Thus it may be taken by valved line 70 to carbon dioxide gas supply 48, it may be carried by valve 71 to a use point, or it may be taken by valved line 72 to a liquefier 73 from where it may be conveyed through line 74 to a use point or through a liquid carbon dioxide pipe line 75, running parallel with coal/liquid carbon dioxide slurry pipeline 12, back to liquid carbon dioxide supply 11 at the coal source point for use in slurry formation at 10. At the coal source point, all or only makeup carbon dioxide may be supplied from a suitable source 77 and liquefied at 78 for use in slurry formation.

The coal transport system of FIGS. 1A and 1B lends itself to well-known techniques to provide a partially or completely automated operation which may be, if desired, controlled by a suitably programmed computer. Such automated control may begin at the coal source point or at any desired point within the system.

Once the waterborne carrier has reached its destination, the coal is unloaded and transported to a desired destination. As will be seen from FIGS. 6A and 6B, this may be a use point within the vicinity or nearby the unloading point, it may be a storage facility, or it may be a remote use point in which case the coal may be slurried with liquid carbon dioxide and moved through a pipeline.

Figure 5:
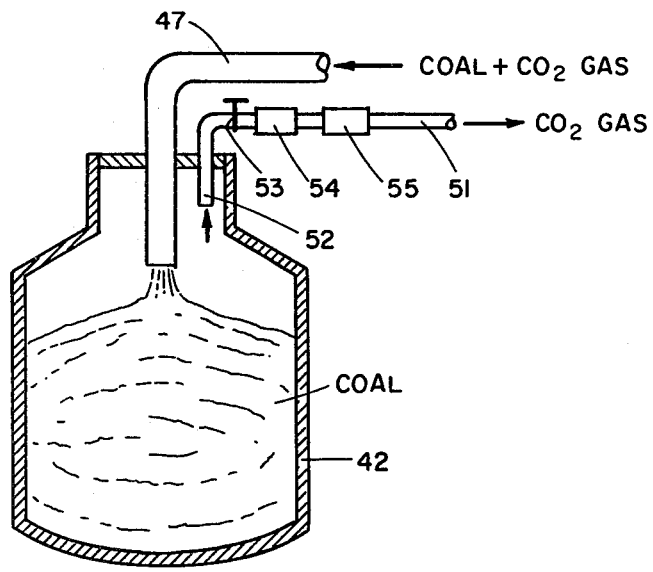
FIG. 5 illustrates, partially in cross section, the loading of coal into a vessel compartment.

Gaseous carbon dioxide from a source 165 is introduced through line 166 into a ship compartment 42 as a pneumatic carrier for the coal contained therein. The coal/gaseous carbon dioxide mixture is carried through line 167 to one of several connecting lines. Thus the directions of flow shown in FIG. 5 are reversed, line 166 corresponding to line 51 and line 167 to line 47. Filter 55 is, of course, not used. Assuming first that the coal is to be stored at or near the harbor, the coal is carried through line 168 to one of the coal storage elevators 169, 170 or 171 through branch conduit 172, 173 or 174 by proper actuation of valve 175, 176 or 177. These elevators are equipped with gaseous carbon dioxide discharge lines 178, 179 and 180, having filters 181, 182 and 183 and being connected to carbon dioxide recycle line 184 going back to source 165.

Coal is drawn from one or more of storage elevators 169, 170 or 171 through discharge valve means 185, 186 or 187 into coal delivery line 188 and is moved therethrough pneumatically with carbon dioxide from supply means 189. Alternatively, air pumped in through line 190 by compressor 191 may be used. The coal/gaseous carbon dioxide mixture may then be delivered to a use point 195 from where all or part of the gaseous carbon dioxide may be recovered through line 196, having filter 197, and line 198 leading to gaseous carbon dioxide supply 189. This carbon dioxide may also be discharged through line 199 or taken by line 200 to a liquefier 201.

If the ultimate use point for the coal is remote from the harbor and/or the coal storage means, then it may be taken as a coal/gaseous carbon dioxide mixture directly from the waterborne carrier via line 205, shown to have valve means 206, or from storage via delivery line 188 to a line 207 in fluid communication with coal slurrying means 208, such as illustrated in FIGS. 2 and 3. The gaseous carbon dioxide used in pneumatically transporting the coal to slurrying means 208 may be withdrawn through line 209 and filter 210 to a liquefier 211 to provide the liquid carbon dioxide required to form a pumpable slurry.

As described above, the slurry is then pumped through pipeline 215, using one or more booster pumping means 216 where necessary, to deslurrying means 217 associated with a use point. Liquid carbon dioxide may be returned by pipeline 218 to the slurry forming means 208 or it may be conveyed by line 219 to some use point. Likewise, any gaseous carbon dioxide in line 220 may be disposed of in any desired manner.

Figure 6A:
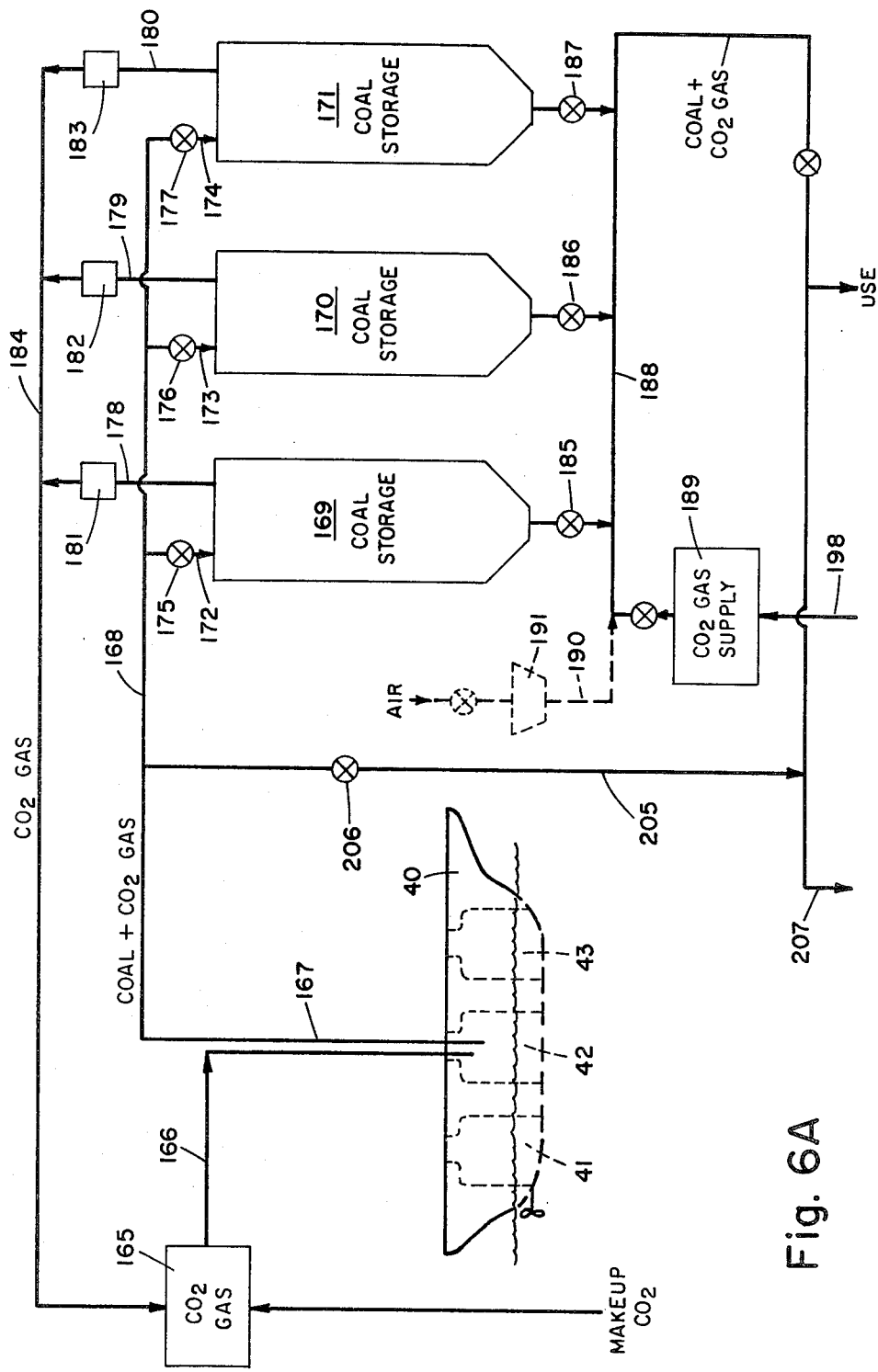
FIGS. 6A and 6B, in combination, comprise a diagram showing the method and apparatus of this invention, including a number of alternative embodiments, for unloading coal from a waterborne carrier and transporting it to a use point.
Figure 6B:
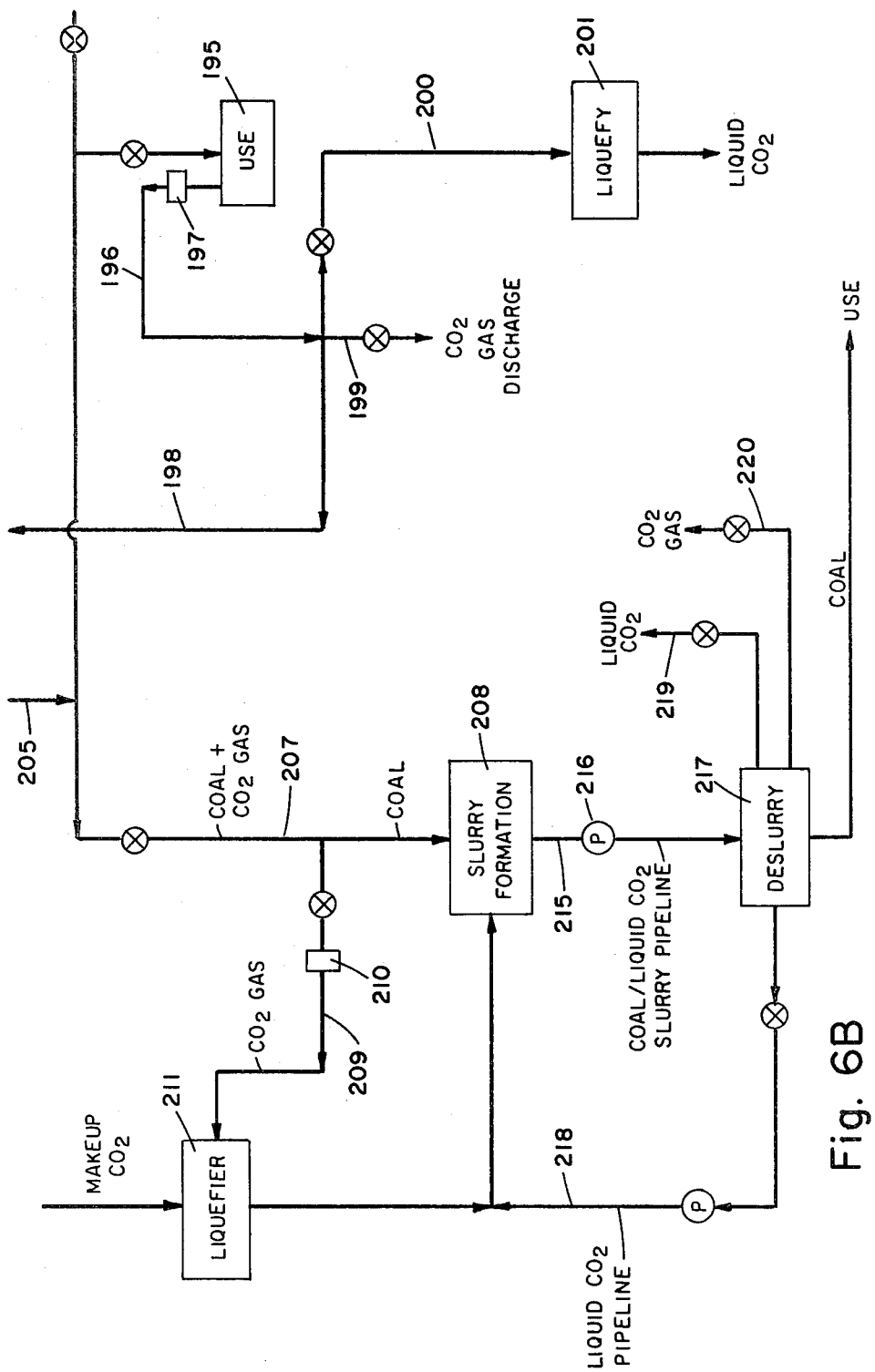

Automatic control of all or a portion of the various embodiments of the coal unloading and disposition system of FIGS. 6A and 6B are also, of course, feasible. As in the case of loading the coal on the waterborne carrier, the unloading of it may be done while the carrier remains anchored in deep water.

It will be seen that by transporting coal in finely divided particulate form using a unique combination of liquid and gaseous carbon dioxide it is possible to eliminate the need for a vast amount of complicated mechanical equipment heretofore required at coal-loading and unloading piers and to substitute for them lines which may be underground and which may even extend beyond the harbor to waterborne carriers anchored along the coast. The equipment required to load or unload a ship or barge in the practice of this invention—deslurrying or slurrying means, coal storage means and carbon dioxide storage and supply means—need not, in fact, be located at the pier, but can be placed in any suitable site. Moreover, because of the type of equipment used and the moving of the coal in fluid media, the method and equipment of this invention are particularly suited to automated operation. Finally, the system offers the possibility of being essentially pollution free.

It will thus be seen that the objects set forth, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A method of transporting coal including one or more intermediate periods of storage, comprising the steps of
   (a) providing coal in finely divided particulate form;
   (b) storing said finely divided coal in a storage space under a protective blanket of gaseous carbon dioxide;
   (c) introducing said coal into said storage space by pneumatically pumping it with gaseous carbon dioxide; and
   (d) slurrying said coal with liquid carbon dioxide;
   (e) pumping the coal/liquid carbon dioxide slurry of step (d) to the vicinity of said storage space before said introducing of said coal into said storage space; and
   (f) deslurrying said coal from the coal/liquid carbon dioxide slurry comprising reducing the pressure on said slurry to that level at which essentially all of said liquid carbon dioxide is vaporized out of said slurry and, while reducing the pressure, introducing into said slurry sufficient heat to replace that lost by reducing said pressure on said slurry and prevent the formation of any appreciable quantity of solid carbon dioxide.

2. A method in accordance with claim 1 wherein said storage space comprises compartments on a waterborne carrier.

3. A method in accordance with claim 1 wherein said storage space comprises land-based storage means.

4. A method of loading coal onto a waterborne carrier, comprising the steps of
   (a) providing coal in finely divided particulate form in a coal/liquid carbon dioxide slurry;
   (b) deslurrying said coal from said liquid carbon dioxide slurry comprising reducing the pressure on said slurry to that level at which essentially all of said liquid carbon dioxide is vaporized out of said slurry and, while reducing the pressure, introducing into said slurry sufficient heat to replace that lost by reducing said pressure on said slurry and prevent the formation of any appreciable quantity of solid carbon dioxide;
   (c) pneumatically pumping said coal onto a waterborne carrier; and
   (d) maintaining a protective gaseous blanket over said coal in said carrier.

5. A method in accordance with claim 4 wherein gaseous carbon dioxide is used to pneumatically pump said coal and to provide said protective blanket.

6. A method in accordance with claim 5 wherein said step of pneumatically pumping said coal onto said waterborne carrier includes the steps of removing from said carrier the gaseous carbon dioxide in excess of that required to provide said protective blanket and removing from said excess carbon dioxide any coal entrained therein.

7. A method in accordance with claim 6 including the step of using said excess carbon dioxide in said step of pneumatically pumping said coal.

8. A method in accordance with claim 5 including the steps of pneumatically pumping said coal into a storage space and storing it under a protective gaseous carbon dioxide blanket subsequent to said step of removing said coal from said slurry and prior to said step of pneumatically pumping said coal onto said carrier.

9. A method in accordance with claim 8 wherein said steps of pneumatically pumping said coal into said storage space and onto a waterborne carrier include the steps of removing from said storage space and from said carrier the gaseous carbon dioxide in excess of that required to provide said protective blanket and removing from said excess carbon dioxide any coal entrained therein.

10. A method in accordance with claim 9 including the step of using said excess carbon dioxide in said steps of pneumatically pumping said coal.

11. A method in accordance with claim 5 wherein said step of providing said coal comprises pumping said slurry through a pipeline from a coal source point and maintaining the temperature of said slurry between about −20° C. and about 30° C. and the pressure between about 20 and about 150 atmospheres.

12. A method in accordance with claim 11 wherein said coal source point comprises a mine, coal dump or railroad car.

13. A method in accordance with claim 11 including the steps of liquefying at least a portion of said vaporized carbon dioxide and returning it to said source point for forming said coal/liquid carbon dioxide slurry.

14. A method of unloading coal from a waterborne carrier comprising the steps of
   (a) providing coal in a finely divided particulate form;
   (b) storing said finely divided coal in a storage space in said carrier under a protective blanket of gaseous carbon dioxide;
   (c) withdrawing said coal from said storage space by pneumatically pumping it with gaseous carbon dioxide;
   (d) slurrying said coal with liquid carbon dioxide;
   (e) pumping the coal/liquid carbon dioxide slurry at step (d) from the vicinity of said storage space after said withdrawing of said coal from said storage space; and
   (f) deslurrying said coal from the coal/liquid carbon dioxide slurry located in the vicinity of an anchorage for said carrier, said deslurrying comprising reducing the pressure on said slurry to that level at which essentially all of said liquid carbon dioxide is vaporized out of said slurry and, while reducing the pressure, introducing into said slurry sufficient heat to replace that lost by reducing said pressure on said slurry and prevent the formation of any appreciable quantity of solid carbon dioxide.

15. A method in accordance with claim 14 wherein said predetermined point comprises coal storage means and includes the steps of providing a protective blanket of carbon dioxide over said coal in said storage means; withdrawing from said storage means the gaseous carbon dioxide in excess of that required to provide said protective blanket; and removing from said excess carbon dioxide any coal entrained therein.

16. A method in accordance with claim 15 including the step of using said excess carbon dioxide in said step of pneumatically pumping said coal.

17. A method in accordance with claim 14 wherein said predetermined point comprises coal slurrying means and includes the steps of forming a coal/liquid carbon dioxide slurry and pumping said slurry, under conditions to maintain said carbon dioxide in said slurry in liquefied form, to a use point.

18. A method in accordance with claim 17 wherein said slurry is maintained at a temperature between about −20° C. and about 30° C. and at a pressure between about 20 and about 150 atmospheres during said pumping step.

19. A method in accordance with claim 18 including the steps of liquefying at least a portion of said vaporized carbon dioxide and returning it to said coal slurrying means for forming said coal/liquid carbon dioxide slurry.

20. A system for the transportation of coal including one or more intermediate periods of storage, comprising in combination
   (a) storage means to store coal in finely divided particulate form under a protective blanket of gaseous carbon dioxide;
   (b) pneumatic pumping means arranged to convey said coal by pneumatically pumping it with gaseous carbon dioxide;
   (c) slurrying means arranged to form a pumpable coal/liquid carbon dioxide slurry;
   (d) deslurrying means arranged to separate said coal from said slurry comprising, in combination, means to reduce the pressure on said slurry to that level at which all of said carbon dioxide is vaporized out of said slurry and, means to introduce into said slurry, during the reduction in pressure sufficient heat to replace that lost by reducing said pressure on said slurry and prevent the formation of any appreciable quantity of solid carbon dioxide; and (e) slurry pumping means arranged to pump said slurry from said slurrying means to said deslurrying means; the order of said means in said system being said slurry means; said slurry pumping means; said deslurrying means; and said pneumatic pumping means, to convey said coal into said storage means, and said pneumatic pumping means, said slurrying means, said slurry pumping means and said deslurrying means to withdraw said coal from said storage means.

21. A system in accordance with claim 20 wherein said storage means comprises a waterborne carrier.

22. A system in accordance with claim 20 wherein said storage means is land based.

23. Apparatus for loading coal onto a waterborne carrier, comprising in combination
   (a) coal supply means to provide coal in finely divided particulate form;
   (b) slurrying means arranged to form a pumpable liquid carbon dioxide slurry with said coal;
   (c) deslurrying means arranged to separate said coal from said slurry and located in the vicinity of an anchorage for said carrier, said deslurrying means comprising in combination, means to reduce the pressure of the coal/liquid carbon dioxide slurry to the level at which all of said liquid carbon dioxide is vaporized from said slurry and means to introduce into said slurry during the reduction in pressure, sufficient heat to replace that lot from reducing said pressure on said slurry and prevent the formation of any appreciable quantity of solid carbon dioxide;
   (d) slurry pumping means arranged to pump said slurry from said slurrying means to said deslurrying means under conditions of temperature and pressure to maintain said carbon dioxide in liquid form; and
   (e) pneumatic pumping means arranged to convey said coal in gaseous carbon dioxide from said deslurrying means onto said waterborne carrier.

24. Apparatus in accordance with claim 23 wherein said coal supply means comprises means to grind coal to particles no greater than about 300 $\mu$m in size, said coal supply means being associated with a mine, coal dump or coal transport means.

25. Apparatus in accordance with claim 23 wherein said slurrying means comprise, in combination, pressure vessel means adapted to contain said coal in finely divided form; means to pressurize said pressure vessel means with gaseous carbon dioxide; and means to slurry liquid carbon dioxide under pressure with said coal in said pressure vessel means.

26. Apparatus in accordance with claim 23 including liquefying means to liquefy at least a portion of said vaporized carbon dioxide; and means to pump the resulting liquid carbon dioxide back to said slurrying means.

27. Apparatus in accordance with claim 23 including means to supply at least a portion of said vaporized carbon dioxide to said pneumatic pumping means.

28. Apparatus in accordance with claim 23 wherein said slurry pumping means comprise pipeline means and pump means arranged to move said slurry through said pipeline at a velocity of at least one foot per second.

29. Apparatus in accordance with claim 23 wherein said pneumatic pumping means comprises in combination, gaseous carbon dioxide supply means; means to disperse said coal in said gaseous carbon dioxide, and conduit means to carry the dispersion of coal and carbon dioxide to said waterborne carrier.

30. Apparatus in accordance with claim 29 wherein said pneumatic pumping means comprise gaseous carbon dioxide return conduit means through which carbon dioxide is discharged from said waterborne carrier; and means to remove coal entrained in said discharged carbon dioxide.

31. Apparatus in accordance with claim 23 including coal storage means to store said coal subsequent to separation from said slurry and prior to being conveyed to said waterborne carrier; said pneumatic pumping means being arranged to convey said coal in gaseous carbon dioxide from said deslurrying means first to said coal storage means.

32. Apparatus for unloading coal from a waterborne carrier, comprising in combination
   (a) coal supply means to provide coal in finely divided particulate form;
   (b) storage means including storage space in said carrier for storing said finely divided particulate form of coal under a blanket of gaseous carbon dioxide;
   (c) pumping means to pneumatically pump said coal from said storage means within said carrier;
   (d) slurrying means arranged to form a pumpable slurry of liquid carbon dioxide and said coal;
   (e) deslurrying means arranged to separate said coal from said slurry and located in the vicinity of an anchorage for said waterborne carrier comprising, in combination, means to reduce the pressure of the coal/liquid carbon dioxide slurry to the level at which all said liquid carbon dioxide is vaporized from said slurry and means to introduce into said slurry during the reduction on pressure, sufficient heat to replace that lost from reducing said pressure in said slurry and prevent the formation of any appreciable quantity of solid carbon dioxide;
   (f) slurry pumping means arranged to pump said slurry from said slurrying means to said deslurrying means under temperature and pressure conditions that maintains the carbon dioxide in liquid form.

33. Apparatus in accordance with claim 32 comprising coal storage means at said predetermined point arranged to store said coal under a protective blanket of said carbon dioxide.

34. Apparatus in accordance with claim 33 including carbon dioxide drawoff means associated with said coal storage means arranged for discharging the carbon dioxide in excess of that required to form said protective blanket; and means to remove coal entrained in said excess carbon dioxide.

35. Apparatus in accordance with claim 32 comprising, in combination, slurrying means at said predetermined point arranged to form a coal/liquid carbon dioxide slurry; deslurrying means at a use point remote from said predetermined point to separate said coal from said slurry; and slurry pumping means to pump said slurry from said predetermined point to said use point.

36. Apparatus in accordance with claim 35 wherein said slurrying means comprise, in combination, pressure vessel means adapted to contain said coal in finely divided form; means to pressurize said pressure vessel means with gaseous carbon dioxide; and means to slurry liquid carbon dioxide under pressure with said coal in said pressure vessel means.

37. Apparatus in accordance with claim 35 wherein said slurry pumping means comprise pipeline means and pump means arranged to move said slurry through said pipeline at a velocity of at least one foot per second.

38. Apparatus in accordance with claim 35 including liquefying means to liquefy at least a portion of said vaporized carbon dioxide; and means to pump the resulting liquid carbon dioxide back to said slurrying means.

39. Apparatus in accordance with claim 35 including means to supply at least a portion of said vaporized carbon dioxide to said pneumatic pumping means.

40. Apparatus in accordance with claim 32 wherein said pneumatic pumping means comprises in combination, gaseous carbon dioxide, supply means; first conduit means to introduce said gaseous carbon dioxide into said waterborne carrier to disperse said coal in said carbon dioxide; and conduit means to carry the dispersion of coal in carbon dioxide to said predetermined point.

41. A method of transporting coal including one or more intermediate periods of storage, comprising the steps of
  (a) providing coal in finely divided particulate form;
  (b) storing said finely divided coal in a storage space under a protective blanket of gaseous carbon dioxide;
  (c) withdrawing said coal from said storage space by pneumatically pumping it with gaseous carbon dioxide; and
  (d) pumping said coal as a coal/liquid carbon dioxide slurry from the vicinity of said storage space after said withdrawing of said coal from said storage space.
  (e) deslurrying said coal from the coal/liquid carbon dioxide slurry said deslurrying comprising reducing the pressure on said coal/liquid carbon dioxide slurry to the level at which essentially all of said liquid carbon dioxide is vaporized from said slurry and, while reducing the pressure, introducing into said slurry sufficient heat to replace that lost by reducing said pressure on said slurry and prevent the formation of any appreciable quantity of solid carbon dioxide.

42. A method in accordance with claim 41 wherein said storage space comprises compartments on a waterborne carrier.

43. A method in accordance with claim 41 wherein said storage space comprises land-based storage means.

* * * * *